(12) United States Patent
Alexopoulos

(10) Patent No.: US 9,218,723 B2
(45) Date of Patent: Dec. 22, 2015

(54) METHODS AND SYSTEMS FOR A GESTURE-CONTROLLED LOTTERY TERMINAL

(71) Applicant: Intralot S.A. - Integrated Lottery Systems and Services, Athens (GR)

(72) Inventor: Ilias Alexopoulos, Metamorfosi (GR)

(73) Assignee: Intralot S.A.—Integrated Lottery Systems and Services, Athens (GR)

( * ) Notice: Subject to any disclaimer, the term of this patent is extended or adjusted under 35 U.S.C. 154(b) by 41 days.

(21) Appl. No.: 13/847,834

(22) Filed: Mar. 20, 2013

(65) Prior Publication Data

US 2013/0252691 A1 Sep. 26, 2013

Related U.S. Application Data

(60) Provisional application No. 61/613,251, filed on Mar. 20, 2012, provisional application No. 61/800,848, filed on Mar. 15, 2013.

(51) Int. Cl.
*A63F 9/24* (2006.01)
*G07F 17/32* (2006.01)
(Continued)

(52) U.S. Cl.
CPC ............ *G07F 17/329* (2013.01); *A63F 13/428* (2014.09); *G06T 7/0071* (2013.01); *G07F 9/023* (2013.01); *G07F 17/3206* (2013.01); *G07F 17/3209* (2013.01); *G07F 17/3211* (2013.01);
(Continued)

(58) Field of Classification Search
CPC ............ G07F 17/3206; G07F 17/3209; G07F 17/3262; G07F 17/329; G06F 3/011; G06K 9/00375

USPC .................................................... 463/36–37
See application file for complete search history.

(56) References Cited

U.S. PATENT DOCUMENTS

2003/0073478 A1* 4/2003 Kovacs ......................... 463/16
2005/0176491 A1* 8/2005 Kane et al. .................... 463/19
(Continued)

FOREIGN PATENT DOCUMENTS

WO 2010/132568 A1 11/2010
WO 2011/116213 A1 9/2011

OTHER PUBLICATIONS

International Search Report and Written Opinion issued in connection with International Application No. PCT/IB2013/000940 dated Aug. 30, 2013.
(Continued)

*Primary Examiner* — Justin Myhr
(74) *Attorney, Agent, or Firm* — Greenberg Traurig, LLP

(57) ABSTRACT

A method including providing a lottery terminal that includes a graphical user interface and a motion capture device to facilitate a user to play in a lottery. The method further includes displaying, on the graphical user interface, a first image with content that includes drawing lottery tickets, instant lottery tickets, lottery games, dynamically-generated animations, and advertisements and detecting, by the motion capture device, a gesture of the user in a three dimensional space surrounding the lottery terminal. The method may further includes displaying, on the graphical user interface, a second image with content based, at least in part, on the gesture of the user; receiving, by the lottery terminal, a payment from the user for playing the lottery; and distributing, by the lottery terminal, a lottery ticket, based, at least in part, on the gesture of the user.

30 Claims, 4 Drawing Sheets

(51) Int. Cl.
*G07F 9/02* (2006.01)
*G06T 7/00* (2006.01)
*A63F 13/428* (2014.01)

(52) U.S. Cl.
CPC ........ *G07F 17/3237* (2013.01); *G07F 17/3262* (2013.01)

(56) References Cited

U.S. PATENT DOCUMENTS

| | | | |
|---|---|---|---|
| 2005/0282603 A1* | 12/2005 | Parrott et al. | 463/1 |
| 2007/0155491 A1* | 7/2007 | Okada | 463/29 |
| 2007/0259717 A1* | 11/2007 | Mattice et al. | 463/36 |
| 2007/0276537 A1* | 11/2007 | Walker et al. | 700/238 |
| 2007/0287539 A1* | 12/2007 | Wu | 463/36 |
| 2008/0268931 A1* | 10/2008 | Alderucci et al. | 463/11 |
| 2008/0274802 A1* | 11/2008 | Joao | 463/25 |
| 2008/0300055 A1 | 12/2008 | Lutnick et al. | |
| 2010/0075749 A1* | 3/2010 | Seshadri | 463/29 |
| 2010/0197390 A1* | 8/2010 | Craig et al. | 463/30 |
| 2010/0255901 A1* | 10/2010 | Garvey et al. | 463/25 |
| 2010/0323785 A1* | 12/2010 | Motyl et al. | 463/25 |
| 2012/0061951 A1* | 3/2012 | Upshaw et al. | 283/102 |

OTHER PUBLICATIONS

Graezel et al., "A Non-Contact Mouse for Surgeon-Compuer Interaction", Technology and Health Care 12 (2004) IOS Press.

* cited by examiner

METHODS AND SYSTEMS FOR A GESTURE-CONTROLLED LOTTERY TERMINAL

RELATED APPLICATIONS

This application claims the benefit of U.S. Provisional Application No. 61/613,251, entitled "METHODS AND SYSTEMS FOR A GESTURE-CONTROLLED VENDING MACHINE," filed Mar. 20, 2012, and U.S. Provisional Application No. 61/800,848, entitled "METHODS AND SYSTEM FOR A GESTURE-CONTROLLED LOTTERY TERMINAL," filed Mar. 15, 2013 which are hereby incorporated by reference herein in their entirety for all purposes.

TECHNICAL FIELD

The instant invention relates to methods and systems for playing the lottery.

BACKGROUND

Lottery terminals for dispensing lottery tickets are known.

SUMMARY OF INVENTION

In some embodiments, the method includes providing a lottery terminal comprising a graphical user interface and a motion capture device so as to facilitate a user to play in a lottery; displaying, by the lottery terminal on the graphical user interface, at least one first image, wherein a first content of the at least one first image is selected from the group consisting of drawing lottery tickets, instant lottery tickets, lottery games, dynamically-generated animations, and advertisements; detecting, by the motion capture device, at least one first gesture of a user in a three dimensional space surrounding the lottery terminal; displaying, by the lottery terminal on the graphical user interface, at least one second image, wherein a second content of the at least second image is based, at least in part, on the at least one first gesture of the user; receiving, by the lottery terminal, at least one payment from the user for playing the lottery; and distributing, by the lottery terminal, at least one lottery ticket, based, at least in part, on the at least one first gesture of the user.

In some embodiments, the payment includes currency, credit card, debit card, and/or payment with a mobile electronic device having a mobile application configured for payment.

In some embodiments, the at least one first gesture includes movement of a body, a limb, and/or a head of the user and/or a change in a facial expression of the user.

In some embodiments, the at least one first gesture includes movement of a body part selected from the group consisting of arm, hand, leg, foot, hand, finger, and toe.

In some embodiments, the method further includes providing, by the lottery terminal, visible and/or audible feedback to the user.

In some embodiments, the visible and/or audible feedback to the user is based, at least in part, on the at least one first gesture.

In some embodiments, the visible and/or audible feedback includes an avatar display, an advertising display, a request for the user to play in the lottery and/or a cursor.

In some embodiments, the avatar display includes an avatar configured to:
 i) facilitate user selection of drawing lottery tickets, instant lottery tickets, and/or lottery games and/or
 ii) repeat the at least one first gesture of the user.

In some embodiments, the method further includes detecting, by the lottery terminal, lack of movement and/or lack of sound from the user for a predetermined time.

In some embodiments, the method further includes providing, by the lottery terminal, visible and/or audible feedback to the user for a sufficient time so as to result in the user departing the three dimensional space surrounding the lottery terminal or the user playing in the lottery.

In some embodiments, the at least one lottery ticket is selected from the group consisting of an electronic representation form lottery ticket and a physical form lottery ticket.

In some embodiments, the method further includes detecting, by the motion capture device, at least one first gesture of a second user in a three dimensional space surrounding the lottery terminal.

In some embodiments, the method further includes determining a position of the user and a second position of the second user and comparing the user position to the second position of the second user to determine a primary user that is positioned closer to the lottery terminal; and conducting the receiving and distributing steps with the primary user.

In some embodiments, the method further includes changing the at least one first image based, at least in part, on:
 i) an inventory of the drawing and/or instant lottery tickets;
 ii) the at least one payment; and/or
 iii) the at least one gesture of the user.

In some embodiments, the changing step includes removing or changing a color of the at least one first image of the drawing and/or instant lottery tickets based, at least in part, on:
 i) unavailability of the drawing and/or instant lottery tickets in the inventory of the drawing and/or instant lottery tickets; and/or
 ii) a cost of the drawing and/or instant lottery ticket exceeding the payment.

In some embodiments, the method further includes detecting, by the motion capture device, at least one second gesture of a user in the three dimensional space surrounding the lottery terminal.

In some embodiments, the second content of the at least first image is based, at least in part, on the at least one second gesture of the user.

In some embodiments, the distributing step is based, at least in part, on the at least one second gesture of the user.

In some embodiments, the method further includes evaluating the at least one gesture to identify the at least one lottery ticket selected by the user.

In some embodiments, the different at least one gestures correspond to identification of the same at least one lottery ticket selected by the user.

In some embodiments, the method includes providing a lottery terminal comprising a graphical user interface and a motion capture device so as to facilitate a user to play in a lottery; displaying, by the lottery terminal on the graphical user interface, at least one first image, wherein a first content of the at least one first image is selected from the group consisting of drawing lottery tickets, instant lottery tickets, lottery games, dynamically-generated animations, and advertisements; detecting, by the motion capture device, at least one first gesture of a user in a three dimensional space surrounding the lottery terminal; evaluating, by the lottery terminal, at least one feature of the user based, at least in part, on the at least one first gesture of the user; displaying, by the lottery terminal on the graphical user interface, at least one second image, wherein a second content of the at least second image is based, at least in part, on the at least one feature of the user; receiving, by the lottery terminal, at least one payment from the user for playing the lottery; and distributing, by the lottery terminal, at least one lottery ticket, based, at least in part, on the at least one first gesture of the user.

In some embodiments, the dynamically-generated animations are based, at least in part, on at least one of the detecting, receiving, and/or distributing steps.

In some embodiments, the at least one feature of the user is selected from the group consisting of a height, weight, position, gender, age, facial feature, hairstyle, clothing and handicap.

In some embodiments, the method further includes displaying, by the lottery terminal on the graphical user interface, the at least first image based, at least in part, on the evaluation of the at least one feature of the user.

In some embodiments, the method further includes locking the receiving and distributing steps based, at least in part, on the age of the user.

In some embodiments, the method further includes unlocking the receiving and distributing steps based, at least in part, on evaluating, by the lottery terminal, the age of the user.

In some embodiments, the method further includes detecting, by at least one camera and/or scanner, at least one lottery ticket provided by the user; evaluating the at least one lottery ticket to determine if the at least one lottery ticket is a winning lottery ticket or a losing lottery ticket; displaying, by the lottery terminal on the graphical user interface, a result of the evaluation of the at least one lottery ticket.

In some embodiments, the system includes a lottery terminal, wherein the lottery terminal comprises: a graphical user interface configured to display at least one image; a motion capture device configured to detect a gesture of a user in a three dimensional space; and a computer system configured to:
(i) interpret the gesture of the user in the three dimensional space and
(ii) display an image on the graphical user interface based, at least in part, on the gesture.

In some embodiments, the system further includes a payment receiving device configured to receive at least one payment from the user.

In some embodiments, the system further includes a lottery ticket dispensing mechanism configured to provide one or more lottery tickets to at least one user.

In some embodiments, the graphical user interface is selected from the group consisting of a liquid crystal display, a light emitting diode screen, and a projector screen.

In some embodiments, the system further includes an audio device configured to provide audio feedback to the user.

In some embodiments, the audio device comprises a microphone and a system configured to recognize speech of the user.

In some embodiments, the system further includes a lottery ticket reader.

In some embodiments, the lottery ticket reader comprises a camera and/or scanner configured for viewing a lottery ticket.

In some embodiments, the system further includes a touchscreen.

In some embodiments, the graphical user interface is configured for viewing a dispensing of a physical form lottery ticket.

In some embodiments, the system further includes the graphical user interface is configured to provide real-time and/or delayed video conferencing.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the description, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Illustrative Operating Environments

Figure 1:
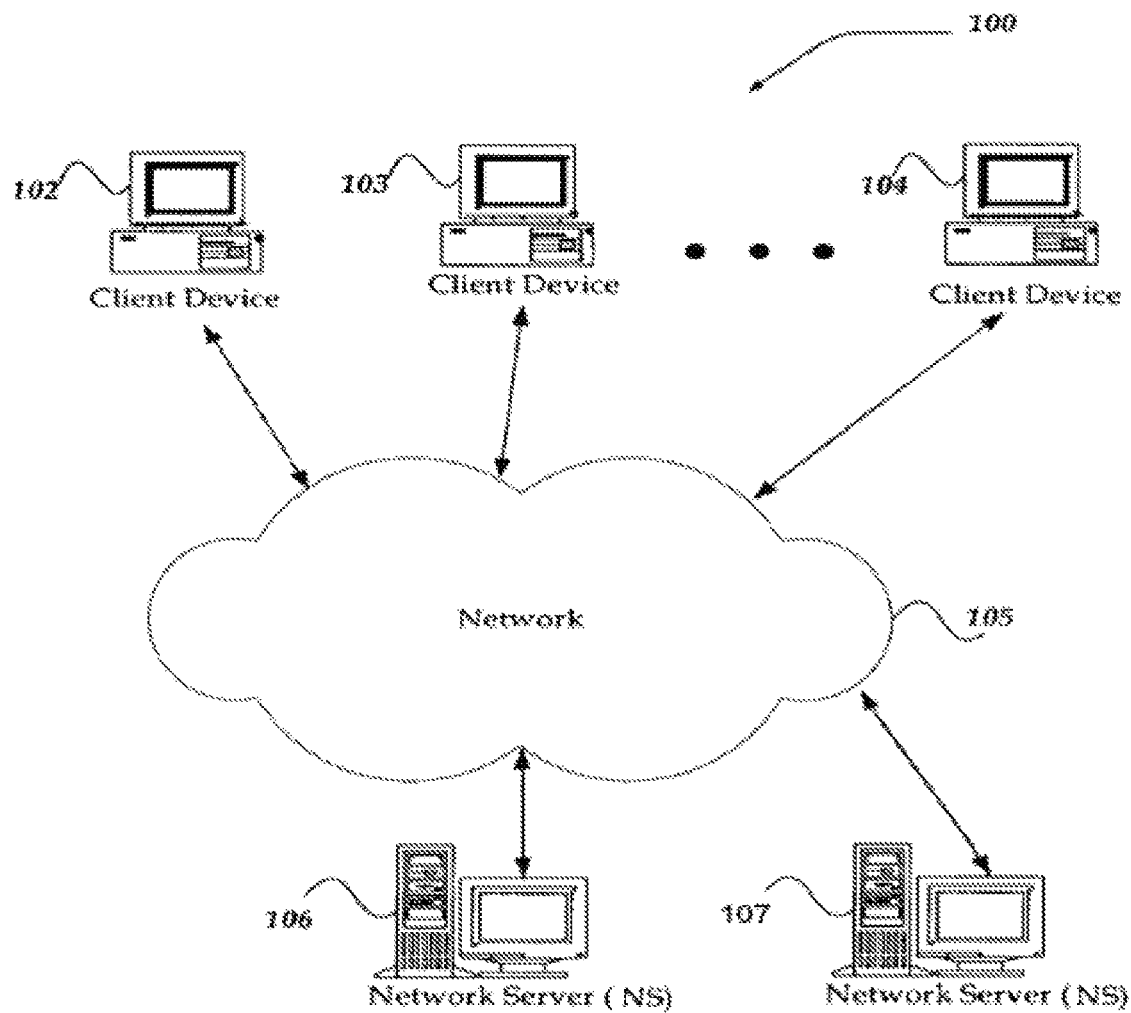
FIG. 1 illustrates features of some embodiments of the present invention.

FIG. 1 illustrates one embodiment of an environment 100 in which the present invention may operate. However, not all of these components may be required to practice the invention, and variations in the arrangement and type of the components may be made without departing from the spirit or scope of the invention. In some embodiments, the inventive system and method may include a large number of members and/or concurrent transactions. In other embodiments, the inventive system and method are based on a scalable computer and network architecture that incorporates varies strategies for assessing the data, caching, searching, and database connection pooling. An example of the scalable architecture is an architecture that is capable of operating multiple servers.

In embodiments, members of the inventive computer system 102-104 (e.g. lottery terminals) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, the invention is programmed in either Java, .Net, QT, C, C++ or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
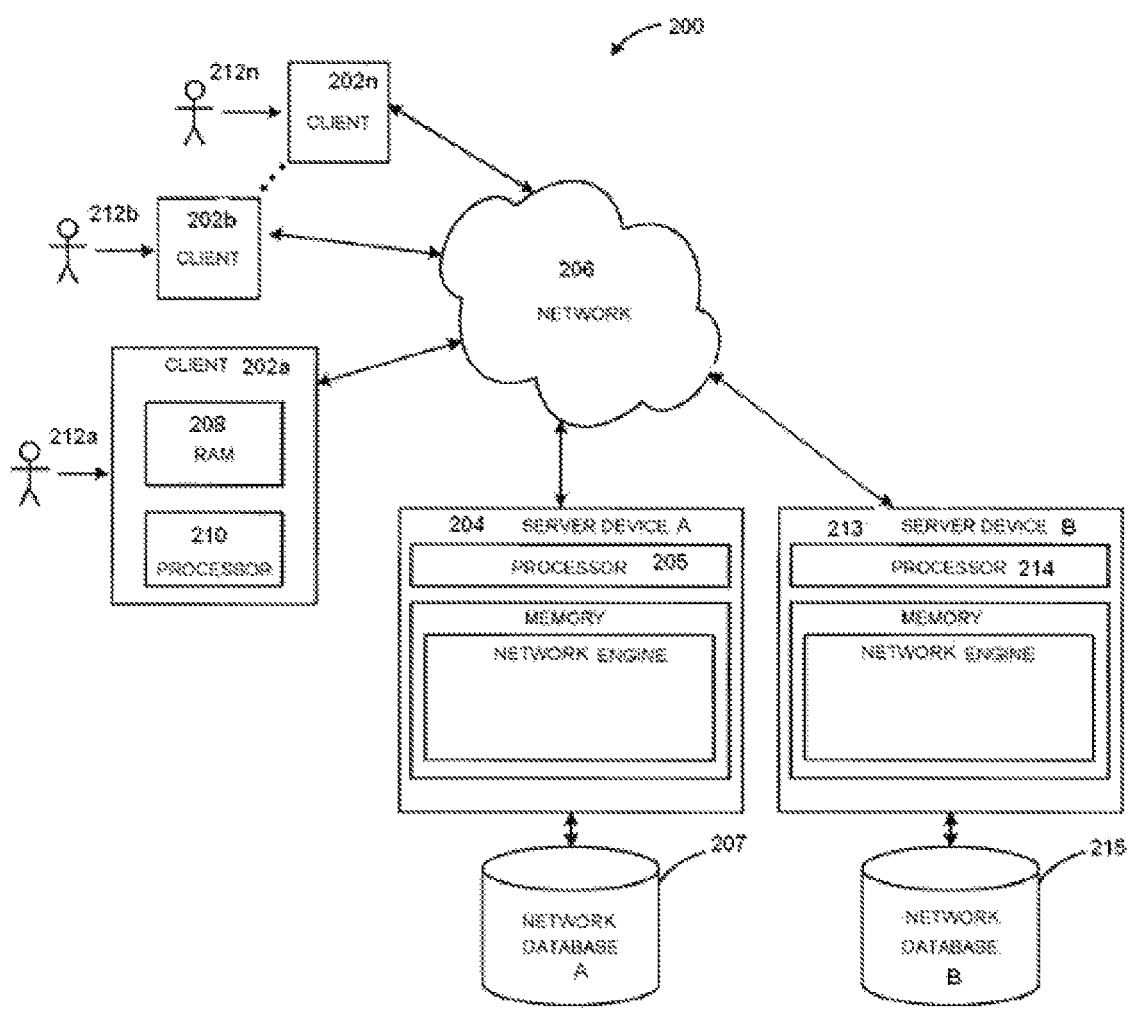
FIG. 2 illustrates features of some embodiments of the present invention.

FIG. 2 shows another exemplary embodiment of the computer and network architecture 200 that supports the inventive method and system. The member devices 202a, 202b thru 202n shown (e.g., lottery terminals) each at least includes a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users (e.g. players, agents, etc.) 212a-n communicate over the network 206 with each other and with other systems and devices coupled to the network 206. As shown in FIG. 2, server devices 204 and 213 may be also coupled to the network 206.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

For purposes of these examples, the term "lottery ticket" means either the physical form (e.g., a ticket, etc.) or electronic representation which is representative of at least one or more lottery games. In some embodiments, all lottery tickets are rendered in physical form. In some embodiments, all lottery tickets are rendered in electronic representation form.

In some embodiments, at least one lottery ticket in physical form and at least one lottery ticket is in electronic representation form.

For purposes of these examples, the term lottery ticket and/or lottery game may include visible and/or invisible data used for playing the lottery. In some embodiments, the lottery ticket and/or lottery game may include data displayed using number(s), character(s), geometrical shapes, playing cards, dice, game boards, and/or combination(s) thereof.

In some embodiments, the method includes providing a lottery terminal comprising a graphical user interface and a motion capture device so as to facilitate a user to play in a lottery; displaying, by the lottery terminal on the graphical user interface, at least one first image, wherein a first content of the at least one first image is selected from the group consisting of drawing lottery tickets, instant lottery tickets, lottery games, dynamically-generated animations, and advertisements; detecting, by the motion capture device, at least one first gesture of a user in a three dimensional space surrounding the lottery terminal; displaying, by the lottery terminal on the graphical user interface, at least one second image, wherein a second content of the at least second image is based, at least in part, on the at least one first gesture of the user; receiving, by the lottery terminal, at least one payment from the user for playing the lottery; and distributing, by the lottery terminal, at least one lottery ticket, based, at least in part, on the at least one first gesture of the user.

In some embodiments, the payment includes currency, credit card, debit card, and/or payment with a mobile electronic device having a mobile application configured for payment.

In some embodiments, the at least one first gesture includes movement of a body, a limb, and/or a head of the user and/or a change in a facial expression of the user.

In some embodiments, the at least one first gesture includes movement of a body part selected from the group consisting of arm, hand, leg, foot, hand, finger, and toe.

In some embodiments, the method further includes providing, by the lottery terminal, visible and/or audible feedback to the user.

In some embodiments, the visible and/or audible feedback to the user is based, at least in part, on the at least one first gesture.

In some embodiments, the visible and/or audible feedback includes an avatar display, an advertising display, a request for the user to play in the lottery and/or a cursor.

In some embodiments, the avatar display includes an avatar configured to:
  i) facilitate user selection of drawing lottery tickets, instant lottery tickets, and/or lottery games and/or
  ii) repeat the at least one first gesture of the user.

In some embodiments, the method further includes detecting, by the lottery terminal, lack of movement and/or lack of sound from the user for a predetermined time.

In some embodiments, the method further includes providing, by the lottery terminal, visible and/or audible feedback to the user for a sufficient time so as to result in the user departing the three dimensional space surrounding the lottery terminal or the user playing in the lottery.

In some embodiments, the at least one lottery ticket is selected from the group consisting of an electronic representation form lottery ticket and a physical form lottery ticket.

In some embodiments, the method further includes detecting, by the motion capture device, at least one first gesture of a second user in a three dimensional space surrounding the lottery terminal.

In some embodiments, the method further includes determining a position of the user and a second position of the second user and comparing the user position to the second position of the second user to determine a primary user that is positioned closer to the lottery terminal; and conducting the receiving and distributing steps with the primary user.

In some embodiments, the method further includes changing the at least one first image based, at least in part, on:
 i) an inventory of the drawing and/or instant lottery tickets;
 ii) the at least one payment; and/or
 iii) the at least one gesture of the user.

In some embodiments, the changing step includes removing or changing a color of the at least one first image of the drawing and/or instant lottery tickets based, at least in part, on:
 i) unavailability of the drawing and/or instant lottery tickets in the inventory of the drawing and/or instant lottery tickets; and/or
 ii) a cost of the drawing and/or instant lottery ticket exceeding the payment.

In some embodiments, the method further includes detecting, by the motion capture device, at least one second gesture of a user in the three dimensional space surrounding the lottery terminal.

In some embodiments, the second content of the at least first image is based, at least in part, on the at least one second gesture of the user.

In some embodiments, the distributing step is based, at least in part, on the at least one second gesture of the user.

In some embodiments, the method further includes evaluating the at least one gesture to identify the at least one lottery ticket selected by the user.

In some embodiments, the different at least one gestures correspond to identification of the same at least one lottery ticket selected by the user.

In some embodiments, the method includes providing a lottery terminal comprising a graphical user interface and a motion capture device so as to facilitate a user to play in a lottery; displaying, by the lottery terminal on the graphical user interface, at least one first image, wherein a first content of the at least one first image is selected from the group consisting of drawing lottery tickets, instant lottery tickets, lottery games, dynamically-generated animations, and advertisements; detecting, by the motion capture device, at least one first gesture of a user in a three dimensional space surrounding the lottery terminal; evaluating, by the lottery terminal, at least one feature of the user based, at least in part, on the at least one first gesture of the user; displaying, by the lottery terminal on the graphical user interface, at least one second image, wherein a second content of the at least second image is based, at least in part, on the at least one feature of the user; receiving, by the lottery terminal, at least one payment from the user for playing the lottery; and distributing, by the lottery terminal, at least one lottery ticket, based, at least in part, on the at least one first gesture of the user.

In some embodiments, the dynamically-generated animations are based, at least in part, on at least one of the detecting, receiving, and/or distributing steps.

In some embodiments, the at least one feature of the user is selected from the group consisting of a height, weight, position, gender, age, facial feature, hairstyle, clothing and handicap.

In some embodiments, the method further includes displaying, by the lottery terminal on the graphical user interface, the at least first image based, at least in part, on the evaluation of the at least one feature of the user.

In some embodiments, the method further includes locking the receiving and distributing steps based, at least in part, on the age of the user.

In some embodiments, the method further includes unlocking the receiving and distributing steps based, at least in part, on evaluating, by the lottery terminal, the age of the user.

In some embodiments, the method further includes detecting, by at least one camera and/or scanner, at least one lottery ticket provided by the user; evaluating the at least one lottery ticket to determine if the at least one lottery ticket is a winning lottery ticket or a losing lottery ticket; displaying, by the lottery terminal on the graphical user interface, a result of the evaluation of the at least one lottery ticket.

In some embodiments, the system includes a lottery terminal, wherein the lottery terminal comprises: a graphical user interface configured to display at least one image; a motion capture device configured to detect a gesture of a user in a three dimensional space; and a computer system configured to:
 (i) interpret the gesture of the user in the three dimensional space and
 (ii) display an image on the graphical user interface based, at least in part, on the gesture.

In some embodiments, the system further includes a payment receiving device configured to receive at least one payment from the user.

In some embodiments, the system further includes a lottery ticket dispensing mechanism configured to provide one or more lottery tickets to at least one user.

In some embodiments, the graphical user interface is selected from the group consisting of a liquid crystal display, a light emitting diode screen, and a projector screen.

In some embodiments, the system further includes an audio device configured to provide audio feedback to the user.

In some embodiments, the audio device comprises a microphone and a system configured to recognize speech of the user.

In some embodiments, the system further includes a lottery ticket reader.

In some embodiments, the lottery ticket reader comprises a camera and/or scanner configured for viewing a lottery ticket.

In some embodiments, the system further includes a touchscreen.

In some embodiments, the graphical user interface is configured for viewing a dispensing of a physical form lottery ticket.

In some embodiments, the system further includes the graphical user interface is configured to provide real-time and/or delayed video conferencing.

In some embodiments, the system includes a lottery terminal or vending machine that uses a 3D space sensor to identify one or more gestures for user input. In some embodiments, the gestures may include one or more facial expressions, arm and hand motions, leg and foot motions and/or hand-finger motions.

In some embodiments, the lottery terminal includes a graphical user interface such as a large display. In some embodiments, the large display may include LCD, LED, Plasma, projector or the like configured to display dynamic content. In some embodiments, the dynamic content may be based, at least in part on, available lottery-related products such as drawing lottery tickets, instant lottery tickets, or lottery games. In some embodiments, the dynamic content may be based, at least in part on, user interaction elements such as avatars, cursors and the like.

In some embodiments, the lottery terminal further includes a motion capture device such as three-dimensional sensor—

Microsoft® Kinect. In some embodiments, the motion capture device provides skeleton data of a user, depth information for background removal, a camera image and user data (age, gender, shape, colors, clothes).

In some embodiments, the lottery terminal displays advertisements & dynamic animations when there are no potential users are positioned within the three dimensional space surrounding the lottery terminal.

In some embodiments, the lottery terminal further provides virtual game selection. In some embodiments, lottery games presented are not hard-linked with dispenser channels, but rather based, at least in part, on an inventory summary. In some embodiments, one or more lottery-related products that are available in other lottery terminals will be presented to a user.

In some embodiments, products that cannot be purchased based on the payment from a user and/or the available credits in the lottery terminal will be either grayed out, changed color or remove from the graphical user interface. In some embodiments, the graphical user interface is optimized to display a larger variety of products. In a non-limiting example, on-line tickets displayed for a graphical user interface contrasts with a traditional machine. In some embodiments, product images displayed on the graphical user interface have a size equal to the real products.

In some embodiments, the lottery terminal is configured to detect the gender of a user. In some embodiments, the graphical user interface displays different products or product list sequences based, at least in part, on the preferences of the detected user gender.

In some embodiments, the lottery terminal is configured to detect the age of a user. In some embodiments, the graphical user interface displays different products or product list sequences based, at least in part, on the preferences of the detected user's age.

In some embodiments, the lottery terminal is configured to detect a minor user. In some embodiments, the graphical user interface aborts the attraction and/or play unless a form of identification is displayed and acknowledged using a bar code reader and driver's license, for example.

In some embodiments, a lottery terminal is configured to detect whether a user is handicapped. In some embodiments, the graphical user interface displays different products or product list sequences based, at least in part, on the viewing level of a handicapped person.

In some embodiments, a lottery terminal displays an avatar to the user to guide the user for selecting one or more products. In some embodiments, the avatar mirrors, at least in part, a user's gestures. In some embodiments, the avatar mirrors, at least in part, a user's gestures to guide the user for selection one or more products.

In some embodiments, the lottery terminal attracts users based, at least in part, on 3D space detection. In some embodiments, upon detection of a potential user in the three dimensional space surrounding the lottery terminal, the graphical user interface changes and/or audio communication is initiated with the user. In some embodiments, the audio communication includes an invitation for the user to interact with the lottery terminal.

In some embodiments, a lottery terminal attracts potential users through gameplay of current users.

In some embodiments, a lottery terminal detects hesitation and/or determination of the user and responds based, at least in part, on the hesitation and/or determination of the user. In some embodiments, on hesitation of user's selection, the lottery terminal may propose a lottery game. In some embodiments, on hesitation for play, the lottery terminal may provide more audio and/or visual content to attract a user.

In some embodiments, the lottery terminal detects multiple potential users. In some embodiments, the user positioned in front of the lottery terminal has priority for selecting a product. In some embodiments, if the user positioned in front move away from the lottery terminal, a second potential user has the priority in play.

In some embodiments, a lottery terminal is configured to detect different gestures for the same or similar selection and/or operation. In some embodiments, the different gestures may include hover and timeout, pressing a virtual button, and/or hovering and head nod.

In some embodiments, a lottery terminal provides a gesture selection display area. In some embodiments, the gesture selection display area is sized larger than physically reachable by the user. In some embodiments, the gesture selection display area is sized larger than physically reachable by the user based, at least in part, by size and/or location.

In some embodiments, the lottery terminal may include a touchscreen providing a dual input or touchless/touchscreen combination graphical user interface.

In some embodiments, the lottery terminal includes an audio device such as a microphone configured for speech recognition. In some embodiments, the speech recognition is used for product selection and/or to help the user.

In some embodiments, the lottery terminal may display a clerk for facilitating a purchase or to provide guidance. In some embodiments, the clerk is displayed based on user request. In some embodiments, the clerk is displayed through real-time video conferencing.

In some embodiments, the lottery terminal further includes a camera or other scanning device for vertical ticket and/or playslip reading and validation. In some embodiments, a user validates a ticket or scans a playslip by holding it in the air and/or touching it in the lottery terminal's front scanner.

In some embodiments, the lottery terminal may attract potential users through ticket validation.

In some embodiments, the lottery terminal displays the actual ticket and/or playslip on the graphical user interface. In some embodiments, the lottery terminal alerts the user if a problem arises during scanning In some embodiments, the lottery terminal displays the results.

In some embodiments, the graphical user interface displays the progress of a user's activity. In some embodiments, the graphical user interface displays a ticket graphic is falling when an instant ticket is requested. In some embodiments, the graphical user interface displays a ticket graphic falling that is synchronized with the actual ticket falling time from the dispenser used, in order to simulate the ticket motion and drive player's gaze to the dispenser tray when the actual ticket arrives.

In some embodiments, the graphical user interface displays transaction status when an on-line ticket is requested, so the player knows how many steps are involved and how many steps are completed. In some embodiments, the steps may include Network link, server request, server response, and/or printing. In some embodiments, the display will aid a user, retailer or other identify the source/step of any issues with the lottery terminal.

In some embodiments, the graphical user interface displays lottery drawing information in real time. In some embodiments, the marks representing the current lottery drawing are gradually added to a blank virtual and/or physical ticket.

In some embodiments, the lottery terminal and/or graphical user interface may be configured so the user can see the actual dispensing of the physical ticket.

Figure 3:
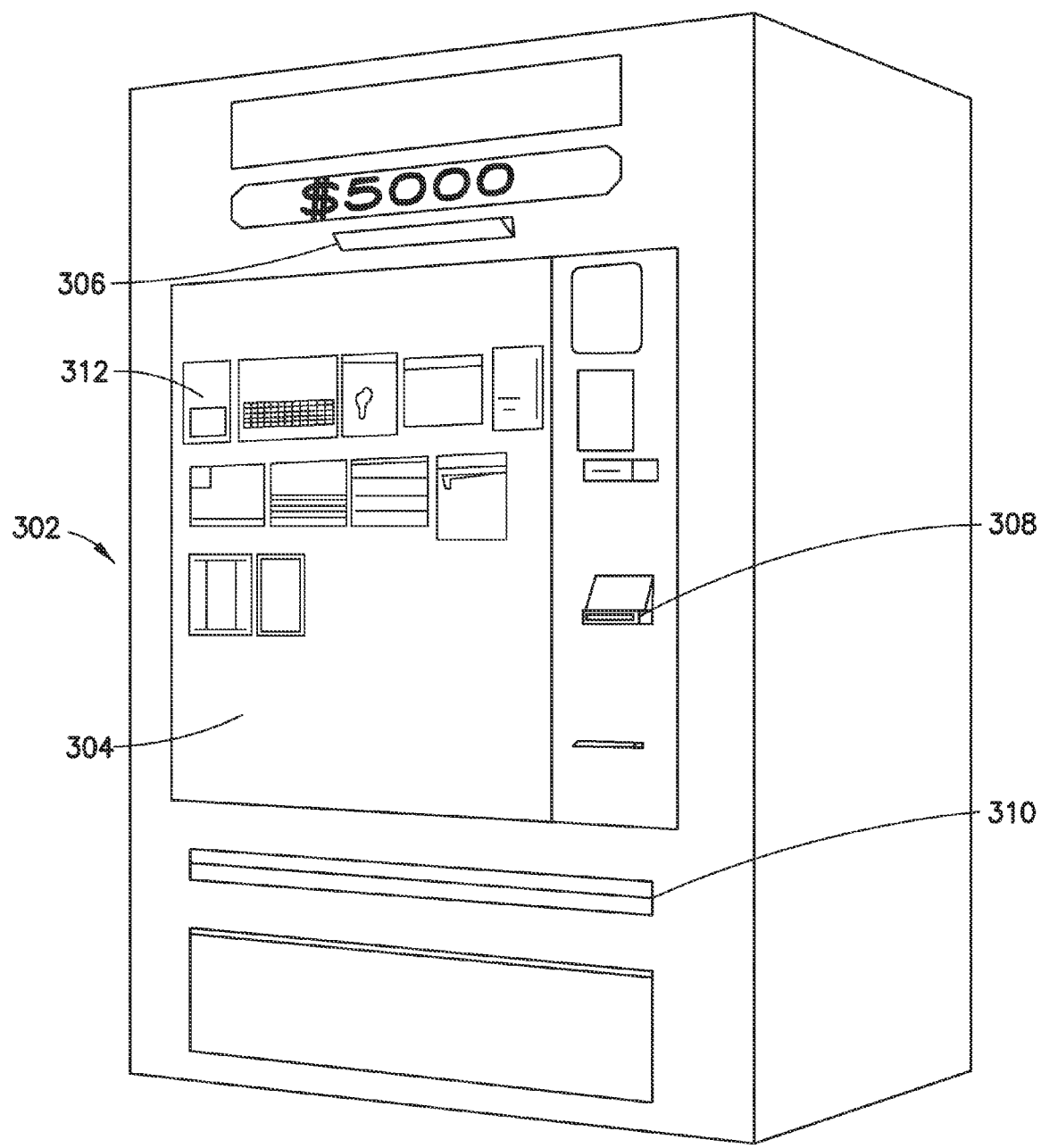
FIG. 3 illustrates features of some embodiments of the present invention.

Illustrative Examples for Methods and Systems for a Gesture-Controlled Lottery Terminal FIG. 3 illustrates an embodiment that includes a lottery terminal 302 having a graphical user interface 304, a motion capture device 306, a payment receiving device 308, and a lottery ticket dispensing mechanism 310. In some embodiments, the graphical user interface 304 displays images 312 of lottery tickets and/or lottery games. In some embodiments, the images may include, but are not limited to, lottery tickets. In some embodiments, the lottery tickets include, but are not limited to, instant result lottery tickets and drawing lottery tickets. In some embodiments, the instant result lottery tickets include, but are not limited to, scratch lottery tickets which require a user to scratch a film or equivalent to reveal a winning or losing ticket and pull lottery tickets which require a user to pull a tab or equivalent to reveal a winning or losing ticket. In some embodiments, the drawing lottery tickets include, but are not limited to, lottery tickets for entry into a drawing or equivalent. In some embodiments, the drawing lottery tickets include numbers or equivalent that can be compared to winning numbers selected during a future drawing. In some embodiments, the graphical user interface displays images of lottery tickets and/or lottery games, a customer avatar or other images related to the lottery terminal.

In some embodiments, the graphical user interface 304 displays lottery tickets and/or lottery games. In some embodiments, the graphical user interface 304 displays images of lottery tickets and/or lottery games. In some embodiments, the graphical user interface 304 displays lottery tickets and/or lottery games in manner similar to traditional vending machines where the physical lottery game tickets are displayed through a series of glass or plastic windows. In some embodiments, the graphical user interface 304 will display images of lottery tickets and/or lottery games corresponding to the available physical forms of the lottery tickets and/or lottery games in the lottery terminal inventory (i.e., the lottery ticket and/or other physical forms of the lottery games are stored within the lottery terminal). In some embodiments, the images of the lottery tickets and/or lottery games to be displayed on a graphical user interface 304 are stored in a network server 106 and downloaded to each lottery terminal (in this embodiment, client device 103) via a network 105. In other embodiments, the graphical user interface 304 will display an advertisement or equivalent when the motion capture device 306 detects a potential user passing within the three dimensional space of the lottery terminal. In other embodiments, the advertisement or equivalent are displayed at random intervals to attract potential users.

In some embodiments, the advertisements or equivalent are displayed every 1 to 60 seconds. In some embodiments, the advertisements or equivalent are displayed every 1 to 10 minutes. In some embodiments, the advertisements or equivalent are displayed every 10 to 60 minutes. In some embodiments, the advertisements or equivalent are displayed every 1 to 3 hours. In some embodiments, the advertisements or equivalent are displayed every 3 to 6 hours.

In an embodiment, the graphical user interface is configured to display images of the available lottery tickets and/or lottery games. In some embodiments, the graphical user interface is sized to display a user's one or more gestures on the screen and/or an advertisement or equivalent. In some embodiments, the graphical user interface is a 42" or larger screen. In some embodiments, the graphical user interface is a liquid crystal display, plasma, light emitting diode screen, or projector screen.

Figure 4:
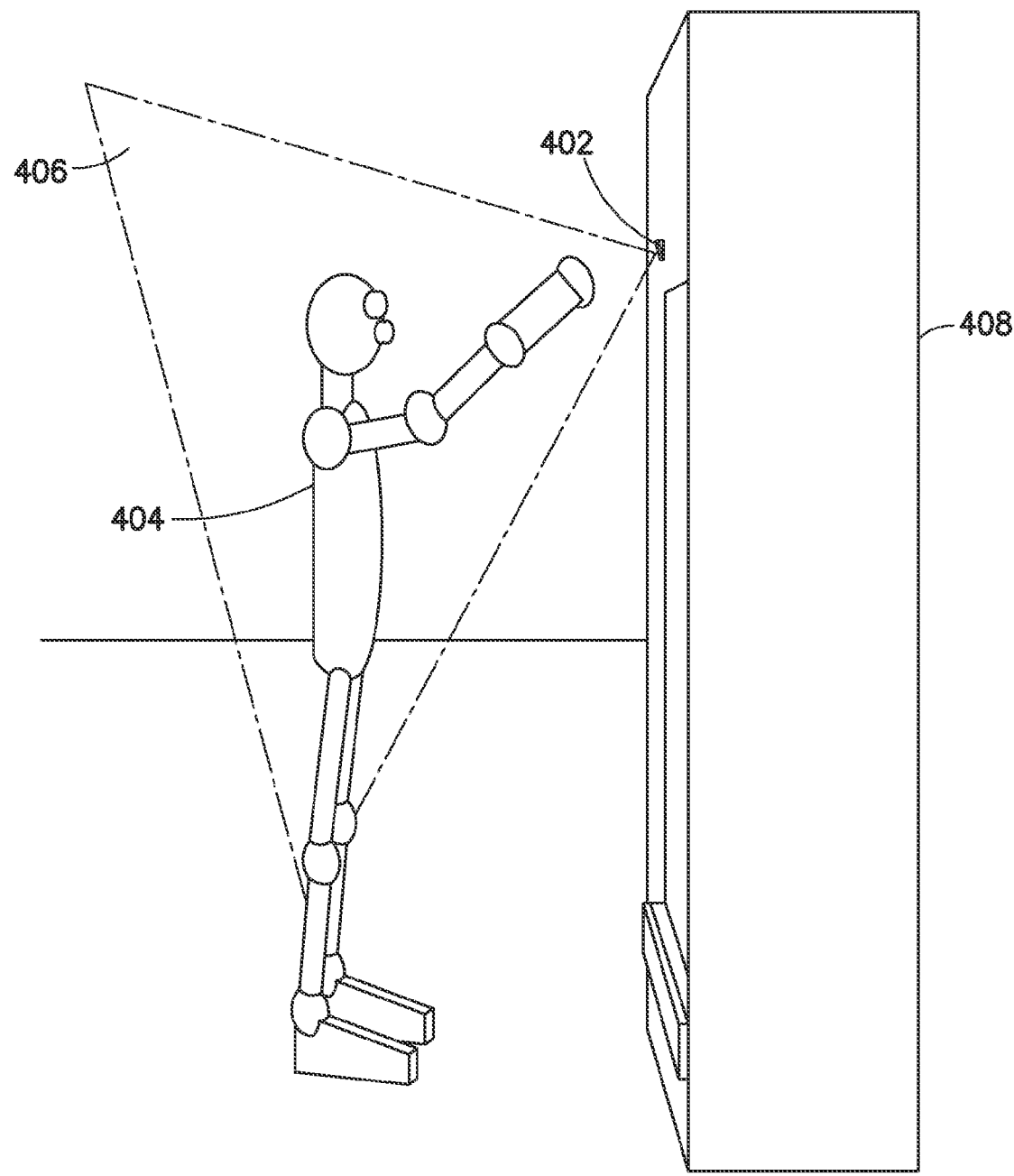
FIG. 4 illustrates features of some embodiments of the present invention.

In some embodiments, the lottery terminal includes a motion capture device 402 for detecting gestures of a user 404 in the three dimensional space 406 surrounding the lottery terminal 408 as illustrated in FIG. 4. In some embodiments, the motion capture device is a Kinect™ provided by Microsoft®, Inc. In some embodiments, the motion capture device is a Kinect™ for use with an XBOX 360®, PC, and/or other computing device. In some embodiments, the motion capture device will provide pixel depth information and/or pixel depth information for each picture element. In some embodiments, the motion capture device will conduct skeleton identification of a user to recognize movement of the user's body, limbs, and/or head. In some embodiments, the motion capture device will detect facial expressions of the user. In some embodiments, the motion capture device is positioned to optimize detection of a user's gestures based, at least in part, on angles, lighting conditions and/or other environmental factors.

In some embodiments, the motion capture device will detect one or more features of a user including, but not limited to, the height, weight, position, gender, age, facial feature, hairstyle, clothing and handicap and/or other feature of a potential user. In some embodiments, the motion capture device will signal the graphical user interface to modify the display to reflect the one or more detected features of a potential user.

In some embodiments, the motion capture device will detect the height of a user positioned within range of the motion capture device. In an embodiment, the motion capture device will then signal the lottery terminal to alter the graphical user interface to accommodate the height of the person. In an embodiment, the graphical user interface will display lottery tickets and/or lottery games in a manner to accommodate the height of a user in a wheelchair or other handicapped user. In some embodiments, the motion capture device will detect a handicapped user by various techniques including, but not limited to, detection of a wheel chair bound person via failure to detect motion in the lower limbs and/or detection of a blind person by detecting a walking stick or equivalent. In some embodiments, the graphical user interface is modified, as required, to accommodate handicapped users although the graphical user interface is out of their physical reach.

In an embodiment, the graphical user interface will display a request to confirm that a user is an adult if the motion capture device detects that the user may be a child based on height or other feature of the user. In some embodiments, the motion capture device is adjusted to prevent operation by children. In some embodiments, the field of view, angle, and/or range of the motion capture device is adjusted to prevent operation by children.

In another embodiment, the motion capture device will recognize if an adult potential user is with children. In some embodiments, if a user with children is detected, the motion capture device may signal the lottery terminal to hide the images of the lottery tickets and/or lottery games and/or invite the adult user to play via visible and/or audible feedback. In some embodiments, the visible and/or audible feedback may include a dynamic display on the graphical user interface and/or audio recording.

In other embodiments, the motion capture device will detect a user's gender. In some embodiments, the motion capture device will signal the graphical user interface to display lottery tickets and/or lottery games targeted to the detected gender. In some embodiments, the lottery terminal is programmed to display lottery tickets and/or lottery games targeted for a female user and other lottery tickets and/or lottery games targeted for a male user.

In an embodiment, the graphical user interface will display a virtual avatar based, at least in part, on at least one feature of the user detected by the motion capture device. In some embodiments, the virtual avatar will look similar to a user. In an embodiment, the virtual avatar will have the same or similar a height, weight, position, gender, age, facial feature, hairstyle, clothing and handicap, and/or other feature of the user. In some embodiments, the avatar will mirror the gestures of the user to facilitate participation in the lottery. In some embodiment, the avatar will participate in the lottery based, at least in part, on the gestures of the user.

In some embodiments, the motion capture device is combined with a touchscreen display or equivalent.

In some embodiments, the motion capture device can be combined with location tracking technology including, but not limited to RFID technology to interact with NFC-enabled devices including, but not limited to, a mobile electronic device that can include, but is not limited to, a mobile phone, Personal Digital Assistant (PDA), Blackberry™, Pager, Smartphone, or any other reasonable mobile electronic device. In some embodiments, the motion capture device alone or coupled with tracking technology can signal the graphical user interface to display lottery tickets and/or lottery games, advertisements or the like based on personal preferences of a user. In some embodiments, the graphical user interface will display the lottery tickets and/or lottery games based, at least in part, on the previous lottery play of the user. In some embodiments, the graphical user interface will display the location, size, and/or other characteristic of the images of the lottery tickets and/or lottery games based, at least in part, on the personal preferences of the user.

In an embodiment, the lottery terminal will include a microphone. In some embodiments, the microphone is configured to conduct speech recognition. In an embodiment, the microphone is configured to detect ambient noise and adjust, as required, the audio volume of the lottery terminal.

In an embodiment, the lottery terminal will remain idle when no potential users are positioned within the three dimensional space surrounding the lottery terminal. In some embodiments, the lottery terminal remaining idle may include, the graphical user interface displaying lottery tickets and/or lottery games, a blank graphical user interface, the lottery terminal entering a power-saving mode or other idle state. In some embodiments, a motion capture device will detect a potential user positioned within the three dimensional space surrounding the lottery terminal. In some embodiments, the lottery terminal will provide visible and/or audible feedback to a potential user. In some embodiments, the feedback may include display of dynamic content, an audio recording, and/or other feedback configured to prompt a user positioned near the lottery terminal to interact with the lottery terminal. In an embodiment, the dynamic content can include, but is not limited to, an animated avatar image or an advertisement. In an embodiment, the audio recording includes, but is not limited to, "Wanna Play?"

In some embodiments, the visible and/or audible feedback to the potential user is provided for a sufficient time so as to result in the user departing the three dimensional space surrounding the lottery terminal or the user playing in the lottery. In some embodiments, the visible and/or audible feedback is displayed every 1 to 60 seconds. In some embodiments, the visible and/or audible feedback is displayed every 1 to 10 minutes. In some embodiments, the visible and/or audible feedback is displayed every 10 to 60 minutes.

In an embodiment, the lottery terminal will return to an idle state if the potential user is no longer positioned in the three dimensional space surrounding the lottery terminal. In some embodiments, the lottery terminal will return to an idle state if the potential user ignores the audible and/or visible feedback. In some embodiments, the motion capture device will detect hesitation or equivalent in the potential user. In an embodiment, the lottery terminal will provide visible and/or audible feedback if the motion capture device detects hesitation of a potential user. In some embodiments, the visible and/or audible feedback will continue until the potential user decides to interact with lottery terminal or depart the three dimensional space surrounding the lottery terminal. In an embodiment, the visible feedback may include dynamic content such as display of lottery tickets and/or lottery games on the graphical user interface. In some embodiments, the graphical user interface display may present, but is not limited to, low cost lottery tickets and/or lottery games, lottery tickets and/or lottery games based on user preferences, or any other display for attracting a potential user to the lottery terminal.

In some embodiments, the lottery terminal will further include a lottery ticket reader where a user can check a lottery ticket. In an embodiment, the lottery terminal will have an area or slot where a user can position a lottery ticket. In an embodiment, the lottery ticket positioned in the area or slot will be evaluated to determine if the lottery ticket is a winning lottery ticket or a losing lottery ticket.

In some embodiments, the lottery terminal will be configured to read a lottery ticket. In an embodiment, a user will position a lottery ticket in the three dimensional space surrounding the lottery terminal. In some embodiments, the graphical user interface will display an image of the lottery ticket that is positioned within the three dimensional space surrounding the lottery terminal. In some embodiments, the lottery ticket image displayed on the graphical user interface will display the lottery ticket recognition marks to allow a user to confirm the lottery ticket has been read accurately. In an embodiment, the lottery ticket will be evaluated to determine if the lottery ticket is a winning lottery ticket or a losing lottery ticket.

In an embodiment, the lottery terminal will display an image of the lottery ticket that failed to be evaluated. In some embodiments, the displayed image of a lottery ticket that failed to be evaluated will show the ticket is unclear, wrinkled and/or includes another defect that prevented evaluation of the ticket. In some embodiments, the user can remedy the ticket defect and repeat the process for subsequent evaluation.

In some embodiments, information on the user's lottery ticket, including but not limited to, the lottery ticket recognition marks such as a bar code or equivalent, is locally recognized by the lottery terminal. In some embodiments, the lottery ticket information is sent from the lottery terminal (in this embodiment, client device 103) to a network server 106 via a network 105 for evaluation. In some embodiments, the lottery ticket is evaluated at the network server 106 and the results of the ticket evaluation are returned to a client device 103 via the network 105. In some embodiments, the graphical user interface displays images while the ticket is evaluated via remote server. In some embodiments, the images displayed during the ticket evaluation process include, but are not limited to, a visual representation of the ticket being transmitted to a remote server and back, an animated avatar, text stating the ticket is being evaluated remotely, and/or interactive games for the user to play.

In some embodiments, the graphical user interface will display interactive lottery games for the user to play including, but not limited to, skill, challenge, and chance games provided for further attraction. In some embodiments, when a user selects lottery tickets and/or lottery games, the graphical user interface displays an animation of the dispensing mechanism that dispenses the lottery ticket followed by the falling lottery ticket. In some embodiments, the animation of the dispense mechanism followed by the falling ticket is timed to correspond with a physical lottery ticket falling from the dispensing mechanism thus guiding the user's gaze. In some embodiments, when the animated virtual lottery ticket reaches the bottom or side of the graphical user interface, the physical lottery ticket arrives at the dispenser mechanism at about the same time, so that the physical ticket is visible to the user.

In some embodiments, the graphical user interface such as a projector screen or equivalent is configured so that the user can view the actual dispensing of the physical lottery ticket. In some embodiments, the graphical user interface will be configured to be at least partially transparent to allow viewing of the actual dispensing of the physical lottery ticket. In some embodiments, the lottery terminal will include an internal light so that the user can view the actual dispensing of the physical lottery ticket. In some embodiments, operation of the internal light will coincide with the actual dispensing of the physical lottery ticket. In some embodiments, after the physical ticket has been dispensed, the graphical user interface will be reconfigured for normal operation that may include, but is not limited, display of lottery tickets and/or lottery games, display of advertisements, or other displays.

In some embodiments, the graphical user interface will display an animated response to a winning lottery ticket. In some embodiments, the animated response will include, but is not limited to, an avatar in an animated pose.

In some embodiments, the motion capture device will detect when a user is providing payment that may include, but is not limited to entering currency, using a credit card, a debit card, and/or mobile electronic device that can include, but is not limited to, a mobile phone, Personal Digital Assistant (PDA), Blackberry™, Pager, Smartphone, or any other reasonable mobile electronic device having a mobile application such as Google Wallet or equivalent configured to provide payment. In an embodiment, the graphical user interface displays lights or equivalent when the motion capture device detects a user will be entering currency, using a credit card, a debit card, and/or a mobile electronic device with a mobile application such as Google Wallet or equivalent.

In an embodiment, the motion capture device will detect when the user has completed entering currency, using a credit card, a debit card, and/or a mobile electronic device with a mobile application such as Google Wallet or equivalent to provide payment and/or generate credits in the lottery terminal. In some embodiments, the lottery terminal will display the lottery play available to a user based on the amount of credits and/or based on the currency entered or the credit card, debit card, and/or mobile electronic device with a mobile application such as Google Wallet or equivalent used with the lottery terminal.

In other embodiments, the motion capture device will recognize if multiple potential users are positioned near the lottery terminal. In some embodiments, the motion capture device will signal the lottery terminal to interact with the user who entered currency, or used a credit card, a debit card, and/or mobile electronic device that can include, but is not limited to, a mobile phone, Personal Digital Assistant (PDA), Blackberry™, Pager, Smartphone, or any other reasonable mobile electronic device with a mobile application such as Google Wallet or equivalent to provide payment and/or generate credits in the lottery terminal. In some embodiments, the motion capture device will signal the lottery terminal to interact with the user in closest proximity to the lottery terminal. In some embodiments, the motion capture device will signal the lottery terminal to change the interacting user based on a gesture from the user and/or other potential user including, but not limited to, shaking head, stepping back, and/or other gesture indicating a reluctance to play.

In some embodiments, the motion capture device will detect if a user is hesitating in choosing from the lottery tickets and/or lottery games. In an embodiment, the motion capture device will signal the graphical user interface will display lottery tickets and/or lottery games. In some embodiments, the graphical user interface will display an image of the lottery tickets and/or lottery games in the form of a lottery ticket. In some embodiments, the displayed lottery ticket is selected based on user-specific information provided by the motion capture device including, but not limited to, gender and/or other feature of the user.

In some embodiments, the user may select lottery tickets and/or lottery games without contacting the graphical user interface. In some embodiments, the lottery tickets and/or lottery games may be selected by an audio command. In some embodiments, a blind user can use body, limb, and/or head gestures and/or audio feedback to select lottery tickets and/or lottery games. In some embodiments, the user will select lottery tickets and/or lottery games using a hand gesture such as pointing to the lottery tickets and/or lottery games. In some embodiments, a cursor or equivalent will be displayed on the graphical user interface to provide visual feedback regarding a gesture or equivalent. In some embodiments, the user may select the lottery tickets and/or lottery games by pointing or equivalent to the lottery tickets and/or lottery games for a predetermined time, pressing a virtual button corresponding to the lottery tickets and/or lottery games, dragging an image of the lottery tickets and/or lottery games to an image of a storage container such as a bucket, nodding the user's head to indicate the selected lottery tickets and/or lottery games or any other manner suitable for identifying the user's selected lottery tickets and/or lottery games.

In some embodiments, the graphical user interface will only display the lottery tickets and/or lottery games selected by the user. In some embodiments, the graphical user interface will alter the display of the lottery tickets and/or lottery games that was not selected by the user. In some embodiments, the graphical user interface will display the lottery tickets and/or lottery games not selected by the user using an alternate color such as gray or equivalent. In some embodiments, the graphical user interface will delete the lottery tickets and/or lottery games that is not selected by the user. In some embodiments, the graphical user interface will display an enlarged image of the lottery tickets and/or lottery games selected by the user. In some embodiments, the graphical user interface will display an animated image of the lottery tickets and/or lottery games moving along the graphical user interface until the physical form or electronic representation form of the lottery tickets and/or lottery games such as a physical lottery ticket is distributed.

In some embodiments, the physical form of the lottery tickets and/or lottery games selected by the user is an instant result lottery ticket. In some embodiments, the lottery terminal will distribute the lottery ticket based on the user's selection.

In some embodiments, the physical form of the lottery tickets and/or lottery games is a drawing lottery ticket. In some embodiments, once the user selects lottery tickets and/or lottery games corresponding to a drawing lottery ticket, the lottery terminal (in this embodiment client server 103) will connect via a network 105 to a network server 106 to access information to be included on the lottery ticket including, but not limited to, numbers, recognition marks, etc. In some embodiments, the lottery ticket information is remotely generated by a network server and then returned to the lottery terminal via a network. In some embodiments, the graphical user interface displays images while the drawing lottery ticket is being generated. In some embodiments, the images displayed during the drawing lottery ticket generation process include, but are not limited to, a blank lottery ticket that is eventually populated with the numbers, recognition marks, etc. when received from the network server, an image of the drawing lottery ticket being generated, an animated avatar, text stating the drawing lottery ticket is being created, and/or an interactive game for the user to play.

In some embodiments, the lottery terminal will distribute the physical drawing lottery ticket after receipt of the information from the remote server. In some embodiments, the drawing lottery ticket will be personalized and may include, but not limited to, a decorative image such as an avatar or equivalent. In some embodiments, an image of the drawing lottery ticket will be transmitted directly to a mobile electronic device that can include, but is not limited to, a mobile phone, Personal Digital Assistant (PDA), Blackberry™, Pager, Smartphone, or any other reasonable mobile electronic device.

In some embodiments, the lottery terminal will collect user-specific information, including, but not limited to, the lottery tickets and/or lottery games selected, user-specific lottery results and/or other user-specific information. In some embodiments, the user-specific information may be posted on a social media page (user's or lottery Host's or other) for the user to illustrate the user's results. In some embodiments, social media posting may be included as part of the lottery game. In some embodiments, the player may be directed to the lottery Host's website.

While a number of embodiments of the present invention have been described, it is understood that these embodiments are illustrative only, and not restrictive, and that many modifications may become apparent to those of ordinary skill in the art. Also, to the extent that such methods are implemented using a computer, not every step must necessarily be implemented using a computer. Further still, the various steps may be carried out in any desired order (and any desired steps may be added and/or any desired steps may be eliminated).

What is claimed is:

1. A method, comprising:
   providing a lottery terminal comprising a graphical user interface and a motion capture device so as to facilitate a first potential user to play in a lottery;
   displaying, by the lottery terminal on the graphical user interface, at least one first image, wherein a first content of the at least one first image is selected from the group consisting of drawing lottery tickets, instant lottery tickets, lottery games, dynamically-generated animations, and advertisements;
   detecting, by the motion capture device, a first passing motion of the first potential user in a three dimensional space recognized by the motion capture device of the lottery terminal wherein the first passing motion is a motion produced by the first potential user passing next to the lottery terminal,
   i) wherein the three dimensional space at least partially surrounds the first potential user's skeleton of the user positioned next to the lottery terminal, and
   ii) wherein the detecting of the first passing motion of the first potential user is based on a pixel depth analysis of the first potential user's skeleton identification involving a plurality of: the first potential user's body, at least one part of the first potential user's at least one limb, and the first potential user's head;
   detecting, by the motion capture device, a second passing motion of a second potential user in the three dimensional space; wherein the second passing motion is a motion produced by the second potential user passing next to the lottery terminal,
   i) wherein the three dimensional space at least partially surrounds the second potential user's skeleton of the user positioned next to the lottery terminal, and
   ii) wherein the detecting of the second passing motion of the second potential user is based on a pixel depth analysis of the second potential user's skeleton identification involving a plurality of: the second potential user's body, at least one part of the second potential user's at least one limb, and the second potential user's head;
   determining, by the motion capture device, a first position of the first potential user and a second position of the second potential user;
   comparing, by the motion capture device, the first position of the first potential user position to the second position of the second potential user to determine who is positioned closer to the lottery terminal; and
   displaying, by the lottery terminal on the graphical user interface, at least one second image, wherein the at least one second image is a first ever personalized communication from the lottery terminal to the first potential user or the second potential user, and wherein a second content of the at least second image is personalized based, at least in part, on:
   1) at least one first characteristic of the first potential user when the first potential user is positioned closer to the lottery terminal, wherein the at least one first characteristic of the first potential user is detected by the motion capture device, and wherein the at least one first characteristic of the first potential user is selected from the group consisting of: gender, height, weight, position, age, facial feature, hairstyle, clothing, handicap, or any combination thereof, and
   2) at least one second characteristic of the second potential user when the second potential user is positioned closer to the lottery terminal, wherein the at least one second characteristic of the second potential user is detected by the motion capture device, and wherein the at least one second characteristic of the second potential user is selected from the group consisting of: gender, height, weight, position, age, facial feature, hairstyle, clothing, handicap, or any combination thereof.

2. The method of claim 1, further comprising:
   receiving, by the lottery terminal, at least one payment from the first potential user or the second potential user for playing the lottery,
   wherein the at least one payment comprises currency, credit card, debit card, and/or payment with a mobile electronic device having a mobile application configured for payment; and
   distributing, by the lottery terminal, at least one lottery ticket, based, at least in part, on the first passing motion of the first potential user or the second passing motion of the second potential user.

3. The method of claim 2, wherein the at least one lottery ticket is selected from the group consisting of an electronic representation form lottery ticket and a physical form lottery ticket.

4. The method of claim 2, further comprising:
conducting the receiving and distributing steps with the first potential user or the second potential user.

5. The method of claim 2, further comprising
changing the at least one first image based, at least in part, on:
  i) an inventory of the drawing and/or instant lottery tickets;
  ii) the at least one payment; and/or
  iii) the first passing motion of the first potential user or the second potential user.

6. The method of claim 5, wherein the changing step comprises removing or changing a color of the at least one first image of the drawing and/or instant lottery tickets based, at least in part, on:
  i) unavailability of the drawing and/or instant lottery tickets in the inventory of the drawing and/or instant lottery tickets; and/or
  ii) a cost of the drawing and/or instant lottery ticket exceeding the payment.

7. The method of claim 5, further comprising detecting, by the motion capture device, a third passing motion of the first potential user or the second potential user in the three dimensional space.

8. The method of claim 7, wherein the second content of the at least first image is based, at least in part, on the third passing motion of the first potential user or the second potential user.

9. The method of claim 7, wherein the distributing step is based, at least in part, on the third passing motion of the first potential user or the second potential user.

10. The method of claim 1, wherein the detecting is further based on at least one change in a facial expression of the first potential user or the second potential user.

11. The method of claim 1, wherein the at least one part of the first potential user's or the second potential user's at least one limb is selected from the group consisting of arm, hand, leg, foot, finger, and toe.

12. The method of claim 1, further comprising providing, by the lottery terminal, visible and/or audible feedback to the first potential user or the second potential user.

13. The method of claim 12, wherein the visible and/or audible feedback to the first potential user or the second potential user is based, at least in part, on the first passing motion of the first potential user or the second passing motion of the second potential user.

14. The method of claim 12, wherein the visible and/or audible feedback comprises an avatar display, an advertising display, and a request for the first potential user or the second potential user to play in the lottery and/or a cursor.

15. The method of claim 14, wherein the avatar display comprises an avatar configured to:
  i) facilitate selection, by a first potential user or a second potential user, of drawing lottery tickets, instant lottery tickets, and/or lottery games and/or
  ii) repeat the first passing motion of the first potential user or the second passing motion of the second potential user.

16. The method of claim 1, further comprising detecting, by the lottery terminal, lack of movement and/or lack of sound from the first potential user or the second potential user for a predetermined time.

17. The method of claim 6, further comprising providing, by the lottery terminal, visible and/or audible feedback to the first potential user or the second potential user for a sufficient time so as to result in the first potential user or the second potential user departing the three dimensional space.

18. The method of claim 1, further comprising evaluating the first passing motion to identify the at least one lottery ticket selected by the first potential user or the second potential user.

19. The method of claim 18, wherein different passing motions correspond to identification of the same at least one lottery ticket selected by the first potential user or the second potential user.

20. A system comprising
a lottery terminal, wherein the lottery terminal comprises:
a graphical user interface configured to display at least one image;
a motion capture device configured to:
  (i) a detect a first passing motion of a first potential user in a three dimensional space recognized by the motion capture device wherein the first passing motion is a motion produced by the first potential user passing next to the lottery terminal;
    wherein the three dimensional space at least partially surrounds the first potential user's skeleton of the user positioned next to the lottery terminal, and
    wherein the detecting of the first passing motion of the first potential user is based on a pixel depth analysis of the first potential user's skeleton identification involving a plurality of: the first potential user's body, at least one part of the first potential user's at least one limb, and the first potential user's head;
  (ii) detect a second passing motion of a second potential user in the three dimensional space recognized by the motion capture device wherein the second passing motion is a motion produced by the second potential user passing next to the lottery terminal; and
    i) wherein the three dimensional space at least partially surrounds the second potential user's skeleton of the user positioned next to the lottery terminal, and
    ii) wherein the detecting of the second passing motion of the second potential user is based on a pixel depth analysis of the second potential user's skeleton identification involving a plurality of: the second potential user's body, at least one part of the second potential user's at least one limb, and the second potential user's head;
  (iii) determine a first position of the first potential user and a second position of the second potential user;
  (iv) compare the first position of the first potential user position to the second position of the second potential user to determine who is positioned closer to the lottery terminal;
  and
  (v) display at least one image on the graphical user interface based, at least in part, on the passing motion of the first potential user or the second potential user, wherein the at least one image is a first ever personalized communication from the lottery terminal to the first potential user or the second potential user, and wherein a content of the at least one image is personalized based, at least in part, on:
    1) at least one first characteristic of the first potential user when the first potential user is positioned closer to the lottery terminal, wherein the at least one first characteristic of the first potential user is detected by the motion capture device, and wherein the at least one first characteristic of the first potential user is selected from the group consisting of: gender, height, weight, position, age, facial feature, hairstyle, clothing, handicap, or any combination thereof, and 2) at least one second characteristic of the second potential user when the second potential user is positioned closer to the lottery terminal, wherein the at least one second characteristic of the second potential user is detected by the motion capture device, and wherein the at least one second characteristic of the second potential user is selected from the group consisting of: gender, height, weight, position, age, facial feature, hairstyle, clothing, handicap, or any combination thereof.

21. The system of claim 20, further comprising a payment receiving device configured to receive at least one payment from the first potential user or the second potential user.

22. The system of claim 20, further comprising a lottery ticket dispensing mechanism configured to provide one or more lottery tickets to at least one first potential user or the second potential user.

23. The system of claim 20, wherein the graphical user interface is selected from the group consisting of a liquid crystal display, a light emitting diode screen, and a projector screen.

24. The system of claim 20, wherein the lottery terminal further comprises an audio device configured to provide audio feedback to the first potential user or the second potential user.

25. The system of claim 24, wherein the audio device comprises a microphone and a system configured to recognize speech of the first potential user or the second potential user.

26. The system of claim 20, wherein the lottery terminal further comprises a lottery ticket reader.

27. The system of claim 26, wherein the lottery ticket reader comprises a camera and/or scanner configured for viewing a lottery ticket.

28. The system of claim 20, further comprising a touch-screen.

29. The system of claim 20, wherein the graphical user interface is configured for viewing a dispensing of a physical form lottery ticket.

30. The system of claim 20, wherein the graphical user interface is configured to provide real-time and/or delayed video conferencing.

* * * * *